(12) United States Patent
Aury et al.

(10) Patent No.: US 11,193,535 B2
(45) Date of Patent: Dec. 7, 2021

(54) RING WITH COMPOSITE AND METAL TWO MATERIAL SQUIRREL TYPE CAGE, AND BEARING ASSEMBLY WITH ROLLING ELEMENTS THAT IS EQUIPPED WITH SUCH A RING

(71) Applicant: SKF Aerospace France S.A.S, Montigny-le-Bretonneux (FR)

(72) Inventors: Alexandre Aury, Valence (FR); Florent Fauchery, Montmeyran (FR); Yves Maheo, Anneyron (FR); Bruno Sorlier, Valence (FR)

(73) Assignee: SKF Aerospace France S.A.S, Montigny-le-Bretonneux (FR)

( * ) Notice: Subject to any disclaimer, the term of this patent is extended or adjusted under 35 U.S.C. 154(b) by 0 days.

(21) Appl. No.: 16/751,216

(22) Filed: Jan. 24, 2020

(65) Prior Publication Data

US 2020/0300302 A1 Sep. 24, 2020

(30) Foreign Application Priority Data

Mar. 18, 2019 (FR) ..................................... 1902743

(51) Int. Cl.
*F16C 27/04* (2006.01)
*F16C 33/60* (2006.01)

(52) U.S. Cl.
CPC .............. *F16C 27/04* (2013.01); *F16C 33/60* (2013.01)

(58) Field of Classification Search
CPC .......... F16C 27/00; F16C 27/04; F16C 27/06; F16C 27/066; F16C 35/077; F01D 25/16; F01D 25/162; F01D 25/164
See application file for complete search history.

(56) References Cited

U.S. PATENT DOCUMENTS

| 9,933,017 | B2* | 4/2018 | Long ..................... F16C 27/04 |
| 10,704,595 | B2* | 7/2020 | Bernardele ........... F16C 35/067 |
| 2003/0190099 | A1 | 10/2003 | Alam et al. |
| 2006/0045404 | A1 | 3/2006 | Allmon et al. |
| 2016/0097331 | A1 | 4/2016 | Venter et al. |
| 2016/0138421 | A1 | 5/2016 | Duong et al. |
| 2016/0327098 | A1 | 11/2016 | Long, Jr. et al. |
| 2016/0369652 | A1 | 12/2016 | Morris |

(Continued)

FOREIGN PATENT DOCUMENTS

| CN | 108691893 A | 10/2018 |
| EP | 2011619 A2 | 1/2009 |
| EP | 3073136 A1 | 9/2016 |

(Continued)

*Primary Examiner* — James Pilkington
(74) *Attorney, Agent, or Firm* — Garcia-Zamor Intellectual Property Law; Ruy Garcia-Zamor; Bryan Peckjian

(57) ABSTRACT

An annular ring having a contact portion, a raceway and a squirrel-type cage secured to the contact portion. The contact portion is formed from a first metal material, and the squirrel cage is formed from a second composite-type material including a matrix in which reinforcing fibres are embedded, the pierced portion of the squirrel cage being attached to an outer surface of the contact portion. Also, a bearing assembly with rolling elements having an outer ring, an inner ring coaxial with the outer ring, and a plurality of rolling elements housed between the raceway of the contact portion of the outer ring and a raceway of the inner ring.

13 Claims, 1 Drawing Sheet

(56) References Cited

U.S. PATENT DOCUMENTS

2018/0223982 A1* 8/2018 Nakao ................ F16C 35/067
2018/0306242 A1   10/2018 Iino et al.

FOREIGN PATENT DOCUMENTS

| EP | 3115564 A1   | 1/2017  |
|----|--------------|---------|
| WO | 2018/109474 A1 | 6/2018  |
| WO | 2018211224 A1 | 11/2018 |

* cited by examiner

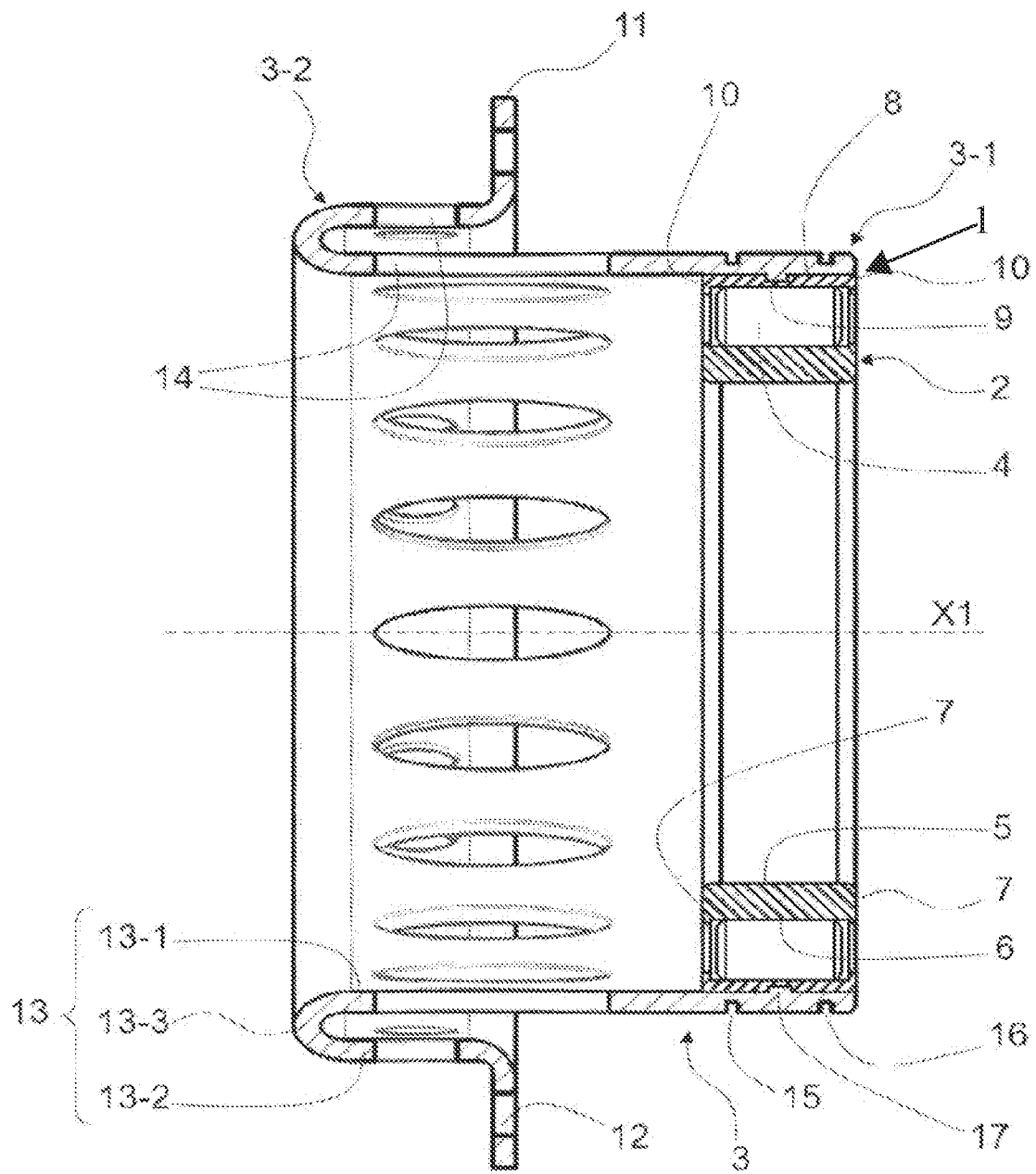

RING WITH COMPOSITE AND METAL TWO MATERIAL SQUIRREL TYPE CAGE, AND BEARING ASSEMBLY WITH ROLLING ELEMENTS THAT IS EQUIPPED WITH SUCH A RING

CROSS-REFERENCE TO RELATED APPLICATIONS

This application claims priority to French Patent Application no. 1902743, filed Mar. 18, 2019, the contents of which are fully incorporated herein by reference.

TECHNICAL FIELD OF THE INVENTION

The present invention relates to a ring with a squirrel-type cage and to a bearing assembly with rolling elements that is equipped with such a ring.

BACKGROUND OF THE INVENTION

In the aeronautical industry, it is known practice to use a bearing assembly with rolling elements that is equipped with a squirrel-type cage.

Such a bearing assembly comprises an inner ring provided with an inner raceway, an outer ring provided with an outer raceway, and a plurality of rolling elements housed between the inner and outer raceways. The outer ring is additionally provided with a squirrel cage extending axially from the outer ring, the outer ring and the squirrel cage being formed in one piece. The squirrel cage is provided with a flange for fastening to a fixed support, for example by means of through-screws, and must withstand forces. The squirrel cage additionally comprises an axial intermediate portion with a plurality of circumferentially distributed apertures so as to provide a certain degree of flexibility of the cage in order to withstand different vibration modes of the assembly. It is also known practice to provide a lubricant film between the outer ring and a surface of the fixed support, the film being housed in a sealed chamber between two seals in order to filter vibrations.

Nowadays, a compromise is found by using materials having properties meeting the technical and structural requirements of such rings for connection assemblies. For example, such rings can be formed from M50NiL, the raceways being additionally carburized.

SUMMARY OF THE INVENTION

The present invention aims to overcome these aforementioned disadvantages.

More particularly, the present invention aims to provide a bearing element with a ring provided with a raceway having improved specific properties, with also a squirrel-type cage with improved specific properties, without compromise between them, the bearing element being less expensive, easy to produce and of reduced weight.

The invention relates to an annular ring comprising a contact portion with an inner surface, an outer surface and lateral walls connecting the inner and outer surfaces, one among the inner and the outer surfaces being provided with a raceway. The ring also comprises a squirrel-type cage secured to the contact portion, the squirrel cage having a pierced portion provided with a plurality of circumferentially distributed apertures, and a fastening collar extending from a free end of the pierced portion.

According to the invention, the contact portion is formed from a first metal material, and the squirrel cage is formed from a second composite-type material comprising a matrix in which reinforcing fibres are embedded, the pierced portion of the squirrel cage being attached to an outer surface of the contact portion.

By virtue of the invention, the contact portion intended to withstand rolling is made of a material specifically adapted to this function. The material of the contact portion can be chosen from a wide variety of materials known for their qualities of withstanding fatigue due to rolling and friction.

The squirrel cage is for its part formed from a lightweight material in which the orientation of the fibres ensures improved resistance to forces.

Specifically, a squirrel cage manufactured with such composite materials can be designed such that the transmission of the forces favours the pure tensioning or compressing of the fibres so as to not stress the resin. The composite material is thus composed of layers of fibres oriented in the direction of the forces, or at the very least in nearby directions. The fibrous structure makes it possible for the squirrel cage to be subjected to high tensile and/or compressive forces with a reduced weight.

Another advantage is that it is sufficient to adapt the orientation of the fibres of the composite material of the squirrel cage to vary the Young's modulus thereof without modifying the design or the dimensions. A specific strength can thus be readily defined and achieved according to a standardized design. It is also possible to modulate the quantity and the orientation of the fibres locally in order to reinforce specific regions of the cage and specific vibratory modes.

Finally, the fibres of a composite material have vibration-attenuating properties, a squirrel cage formed from such a composite material having de facto improved vibration-attenuating properties.

Another advantage of the present invention is that of providing a ring of reduced weight by comparison with a ring formed in one piece from metal. Moreover, a ring according to the present invention is less expensive than a similar ring formed in one piece from metal by virtue of the numerous cutting and machining operations carried out, resulting in a certain loss of material. Moreover, only the contact portion of reduced size is intended to possibly receive a surface coating or a heat treatment.

According to other advantageous but non-obligatory features of the invention, such a ring may also include the following features, taken in isolation or with any technically feasible combination:

The first material of the contact portion is made of steel, for example: AMS6444, AMS6491 or AMS6278.

The fibres of the second composite material of the squirrel cage are made of carbon, glass, Kevlar, Vectran or a combination of fibres of different types.

The matrix of the second composite material of the squirrel cage is an epoxy, polyamide or phenolic resin.

The pierced portion of the squirrel cage comprises a face provided with an annular slot in which the contact portion is housed.

The pierced portion of the squirrel cage comprises a face provided with two annular grooves intended to receive O-ring seals in order to delimit a space intended to receive an oil film to attenuate vibrations.

The fastening portion of the squirrel cage comprises at least one through-hole intended to receive a fastening screw.

The surface opposed to the raceway is provided with a recessed region, the composite material of the squirrel cage being received in a fitted manner in the recessed region.

The recessed region consists of an annular groove.

The present invention also relates to a bearing assembly with rolling elements that is provided with a first ring according to any one of the preceding embodiments, with a second ring coaxial with the ring, and with a plurality of rolling elements housed between the raceway of the contact portion of the first ring and a raceway of the second ring.

The bearing assembly may also include the following features, taken in isolation or with any technically feasible combination:

The first ring is an outer ring, and the second ring is an inner ring.

The first ring is an inner ring, and the second ring is an outer ring.

The rolling elements are balls.

The rolling elements are rollers.

The rolling elements are held so as to be regularly spaced circumferentially by a cage.

The rolling elements are held so as to be regularly spaced circumferentially by spacer elements each arranged circumferentially between two adjacent rolling elements.

The inner ring is made of steel, for example of AMS6444, AMS6491 or AMS6278.

BRIEF DESCRIPTION OF THE FIGURES

The invention will be better understood on reading the following description given solely by way of non-limiting example.

The description is given with reference to the appended drawing, in which:

FIG. 1 is a cross-sectional representation of a bearing element with rolling elements that is provided with a cage according to one embodiment of the invention.

DETAILED DESCRIPTION OF THE INVENTION

FIG. 1 illustrates a bearing assembly with rolling elements that is designated 1 in its entirety and has a central axis X1.

The bearing 1 comprises an inner ring 2, an outer ring 3 and a plurality of rolling elements 4.

The inner ring 2 is provided with a substantially cylindrical inner surface 5, a cylindrical outer surface 6 forming an inner raceway for the rolling elements 4, and lateral walls 7 connecting the inner 5 and the outer 6 surfaces.

The inner ring 2 is formed from steel, for example from AMS6444, AMS6491 or AMS6278.

The outer ring 3 is provided with a contact portion 3-1 and with a squirrel-type cage 3-2 secured to the portion 3-1.

The contact portion 3-1 comprises a substantially cylindrical outer surface 8, a cylindrical inner surface 9 forming an outer raceway for the rolling elements 4, and lateral walls 10 connecting the outer 8 and inner 9 surfaces.

The rolling elements 4 are housed between the inner 6 and outer 9 raceways of the inner ring 2 and of the contact portion 3-1 of the outer ring 3, respectively. In the example illustrated in FIG. 1, the rolling elements 4 are cylindrical rollers having an axis parallel to the central axis X1. Alternatively, the rolling elements may be other types, for example balls or tapered rollers.

The outer ring 3 is additionally provided with a squirrel cage 3-2 secured to the contact portion 3-1 and extending essentially axially.

The squirrel cage 3-2 is provided with a fastening flange 11 extending essentially radially and intended to be fastened securely to a fixed support (not shown), for example by means of threaded screws passing through through-holes 12 and being housed in correspondingly internally threaded openings in the support.

The squirrel cage 3-2 additionally comprises an essentially axial pierced portion 13 with a plurality of circumferentially distributed apertures 14 so as to provide a certain degree of flexibility of the cage 3-2 in order to withstand different vibration modes of the assembly. According to the embodiment illustrated in FIG. 1, the pierced portion 13 comprises two axial portions 13-1, 13-2, each provided with apertures 14, the axial portion 13-2 having a diameter greater than that of the axial portion 13-1. The two axial portions 13-1, 13-2 are connected by a fold portion 13-3. The fastening flange 11 extends radially from a free end of the axial portion 13-2 of greater diameter.

According to an alternative embodiment (not shown), the pierced portion 13 extends axially without fold, the fastening portion 11 extending radially from the free end of the pierced portion 13.

Advantageously, the portion 13-1 of the pierced portion 3-1 comprises an outer surface with two circumferential slots 15, 16 each able to receive an O-ring seal (not shown), a fluid film being provided axially between the two seals housed in the slots 15, 16, the film being wedged radially between the outer surface of the squirrel cage 3-2 and a surface of a fixed support (not shown) in order to form a vibration-attenuating means.

According to the invention, the contact portion 3-1 is formed from a first metal material, and the squirrel cage 3-2 is formed from a second composite-type material.

The contact portion 3-1 is advantageously made of steel, for example: AMS6444, AMS6491 or AMS6278. The contact portion can be obtained by any suitable method, in particular by moulding and machining a metal material, or else by 3D printing. The raceway 9 can be provided with a surface coating, in particular to reduce the rolling friction coefficient. The contact portion 3-1 can also undergo a heat treatment in order to optimize the hardness thereof.

The squirrel cage 3-2 is made of composite material comprising a matrix in which reinforcing fibres are embedded.

The fibres of the composite material of the squirrel cage 3-2 are made of carbon, glass, Kevlar, Vectran or a combination of fibres of different types. The matrix of the composite material of the squirrel cage 3-2 is an epoxy, polyamide or phenolic resin.

The pierced portion 13 of the squirrel cage 3-2 is attached to the outer surface 8 of the contact portion 3-1. According to one embodiment (not shown), the portion 13-1 of the pierced portion 13 comprises a surface opposed radially to the slots 15, 16 and provided with a circumferential slot in which the contact portion 3-1 is housed.

Advantageously, the outer surface 8 of the contact portion is provided with an annular groove 17, and the composite material of the squirrel cage 3-2 externally surrounds the outer surface 8 of the contact portion 3-1 and has emerging therefrom, in the direction of the surface 8, radial projecting portions received in a fitted manner in the annular groove 17. The fixed connection between the squirrel cage 3-2 and the contact portion 3-1 is thus reinforced by increasing the contact area between the composite material and the metal, accordingly increasing the adhesion effect between these components. Moreover, the radial projecting portions create resistance reliefs so as to form means of retaining two components 3-1, 3-2 in the two axial directions.

The annular groove 17 is represented in FIG. 1 with a rectangular shape in axial cross section. Alternatively, the annular groove can have any other adapted shape, for example a dovetail or triangular shape. According to another alternative, the outer surface 8 is provided with at least one non-annular recessed region.

The composite material of the squirrel cage 3-2 is moulded so as to cover the outer surface 8 of the contact portion 3-1, in particular by filling the groove 17. Following this method step, the composite material adheres firmly to the contact portion 3-2. There is thus obtained a non-demountable outer ring 3 assembly, as represented in FIG. 1.

In addition, the technical features of the various embodiments may be totally and only for some of them combined with one another. Thus, the bearing assembly may be adapted in terms of cost, performance and simplicity of implementation.

The invention claimed is:

1. An annular ring comprising:
    a contact portion having a radial inner surface, a radial outer surface defining a annular groove therein, and lateral walls connecting the radial inner surface and the radial outer surface, the radial inner surface being provided with a raceway, and
    a squirrel cage comprising a portion located on the radial outer surface of the contact portion and engaging the annular groove, the portion axially overlapping the radial outer surface of the contact portion but not radially overlapping the lateral walls of the contact portion, the squirrel cage having a pierced portion provided with a plurality of circumferentially distributed apertures, and a fastening collar extending from a free end of the pierced portion, wherein
    the contact portion is formed from a metal material and the squirrel cage is formed from a composite material comprising a matrix in which reinforcing fibres are embedded, the pierced portion of the squirrel cage being axially spaced from the contact portion.

2. The annular ring according to claim 1, wherein the metal material of the contact portion is made of steel.

3. The annular ring according to claim 1, wherein the fibres of the composite material of the squirrel cage are made of carbon, glass, Kevlar, Vectran or a combination of fibres of different types.

4. The annular ring according to claim 1, wherein the matrix of the composite material of the squirrel cage is an epoxy, polyamide or phenolic resin.

5. The annular ring according to claim 1, wherein the portion of the squirrel cage which axially overlaps the contact portion comprises a face provided with a radially projecting portion that is configured to engage an annular slot in which the contact portion is housed.

6. The annular ring according to claim 1, wherein the portion of the squirrel cage which axially overlaps the contact portion comprises a face provided with two circumferential slots configured to receive O-ring seals in order to delimit a space intended to receive an oil film to attenuate vibrations.

7. The annular ring according to claim 1, wherein the fastening collar of the squirrel cage comprises at least one through-hole configured to receive a fastening screw.

8. A bearing assembly with rolling elements comprises:
    a first ring providing:
        a contact portion having a radial inner surface, a radial outer surface defining a annular groove therein, and lateral walls connecting the radial inner surface and the radial outer surface, the radial inner surface being provided with a raceway, and
        a squirrel cage located on the radial outer surface of the contact portion, the squirrel cage axially overlapping and abutting the radial outer surface of the contact portion but does not radially overlap the lateral walls of the contact portion, the squirrel cage having a pierced portion provided with a plurality of circumferentially distributed apertures, and a fastening collar extending from a free end of the pierced portion, wherein
        the contact portion is formed from a metal material, and the squirrel cage is formed from a composite material comprising a matrix in which reinforcing fibres are embedded, the pierced portion of the squirrel cage being attached to an outer surface of the contact portion, and
    a second ring coaxial with the first ring, and with a plurality of rolling elements housed between the raceway of the contact portion of the first ring and a raceway of the second ring.

9. The annular ring according to claim 8, wherein the fibres of the composite material of the squirrel cage are made of carbon, glass, Kevlar, Vectran or a combination of fibres of different types.

10. The annular ring according to claim 8, wherein the matrix of the composite material of the squirrel cage is an epoxy, polyamide or phenolic resin.

11. A bearing assembly with rolling elements comprises:
    a first ring providing:
        a contact portion having a radial inner surface, a radial outer surface defining a annular groove therein, and lateral walls connecting the radial inner surface and the radial outer surface, the radial inner surface being provided with a raceway, and
        a squirrel cage located on the radial outer surface of the contact portion, the squirrel cage having a pierced portion provided with a plurality of circumferentially distributed apertures, and a fastening collar extending from a free end of the pierced portion, wherein
        the contact portion is formed from a metal material, and the squirrel cage is formed from a composite material comprising a matrix in which reinforcing fibres are embedded, and
    a second ring coaxial with the first ring, and with a plurality of rolling elements housed between the raceway of the contact portion of the first ring and a raceway of the second ring, the fastening collar of the squirrel cage not axially overlapping the second ring.

12. The annular ring according to claim 11, wherein the fibres of the composite material of the squirrel cage are made of carbon, glass, Kevlar, Vectran or a combination of fibres of different types.

13. The annular ring according to claim 11, wherein the matrix of the composite material of the squirrel cage is an epoxy, polyamide or phenolic resin.

* * * * *